Jan. 27, 1942.  G. A. RUBISSOW  2,270,902
ANTIVIBRATION MEANS AND METHOD OF USE OF SAME
Filed Nov. 25, 1939  2 Sheets-Sheet 1
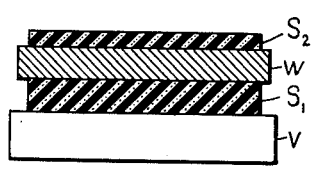
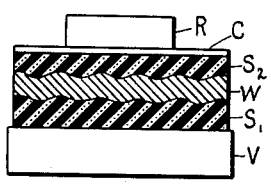
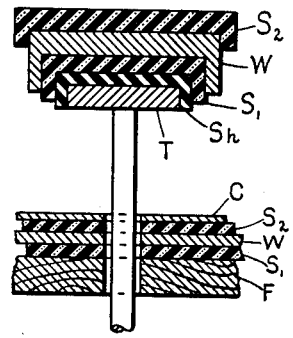
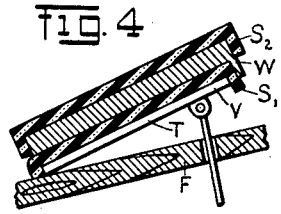
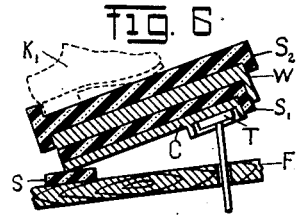
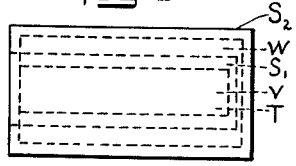
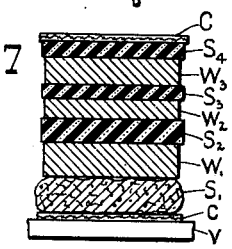
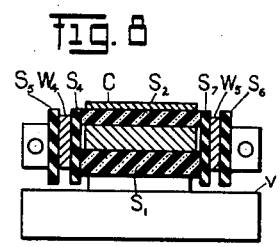
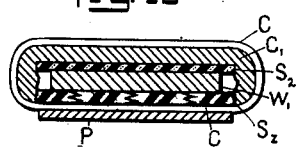
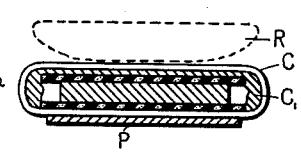
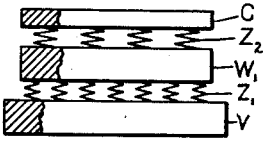
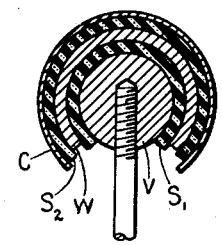
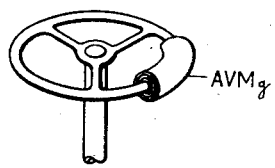
INVENTOR.
George A. Rubissow.

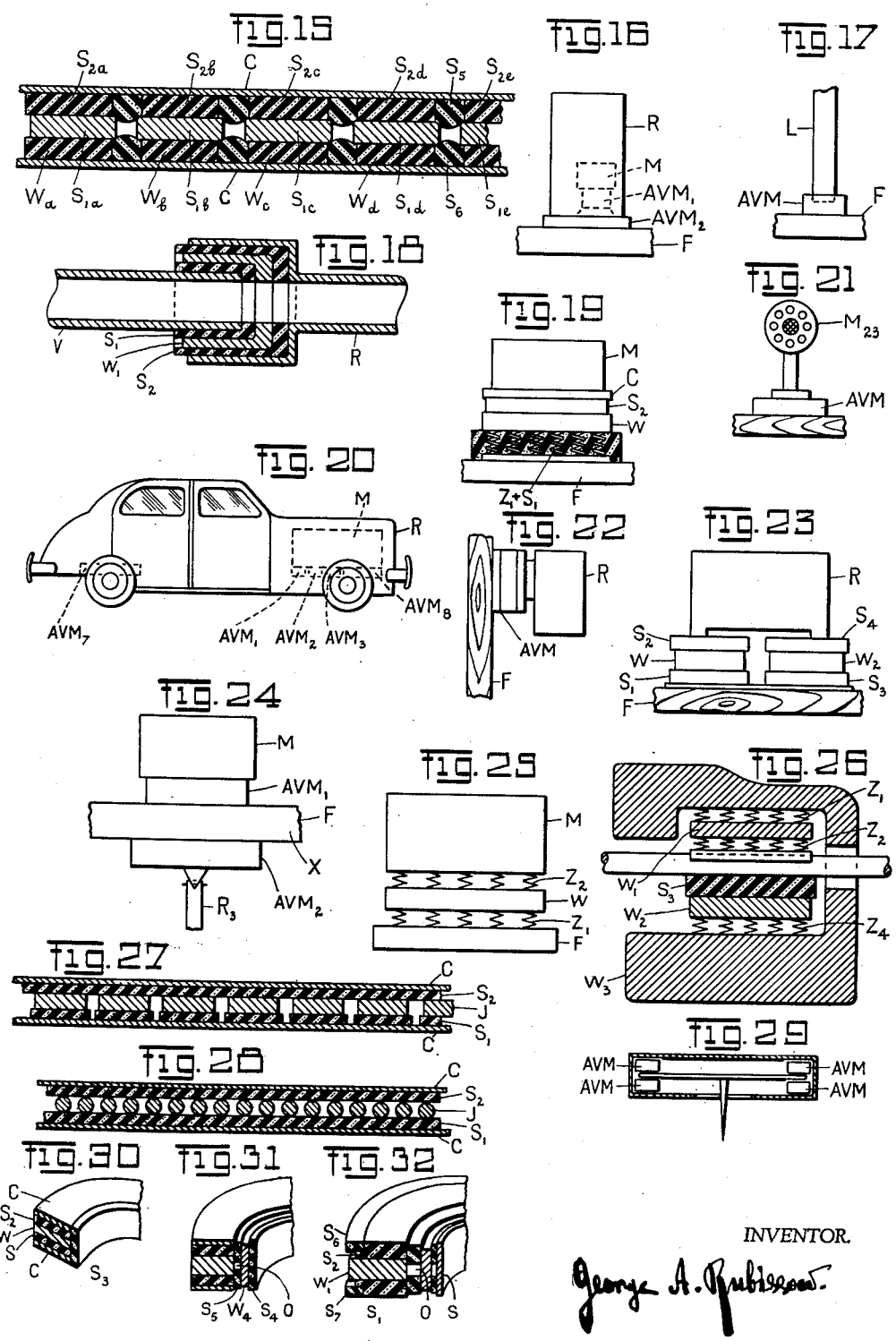

Patented Jan. 27, 1942

2,270,902

UNITED STATES PATENT OFFICE 2,270,902

ANTIVIBRATION MEANS AND METHOD OF USE OF SAME

George A. Rubissow, New York, N. Y.

Application November 25, 1939, Serial No. 306,072

6 Claims. (Cl. 248—358)

This invention provides several devices of various aspects, all of them embodying the same novel principle for eliminating vibrations of different types, i. e. vibrations or oscillations of low or high frequency, periodic or non-periodic.

The sources of such vibrations are various and many. For instance, a refrigerator and washing machine will cause the floor, and the walls of the room in which they stand to vibrate. The engine of a car will vibrate the entire chassis including its occupants. In a motor vehicle the driver's foot contacting the accelerator pedal, his hands resting on the steering wheel and the passengers' feet resting on the floor as well as the seats themselves, are all subjected to unremitting vibrations.

It is well known that long-continuing vibrations may cause serious fatigue, and an illness which does not necessarily show itself immediately but which may in due time injure the health and shorten the life of the individual. It is the object of this invention to help eliminate so far as is technically possible, various kinds of vibrations.

One provision of this invention consists in introducing between the vibrating body and the object or the person receiving the vibration, a device by means of which such vibrations are amortized entirely or almost entirely.

For the convenience of the description, the body, the motor, or any other source of vibration will hereinafter be referred to as vibrating body and the device, the object or the body which receives the effect of the vibrations will be called the receiving body.

The novel features of this invention will more fully appear from the following description when the same is read in connection with the accompanying drawings and the appended claims. It is to be expressly understood, however, that the drawings are for purposes of schematical illustration only and are not intended as a definition of the design or the limits of the several aspects of this invention.

All figures represent different aspects of this invention in simplified and diagrammatical form.

In the drawings wherein like reference characters refer to like parts through the several views:

Figure 1 represents a side cross-sectional view of the anti-vibration means.

Figure 2 represents a side-view of another aspect of the anti-vibration means.

Figure 3 is a side cross-sectional view of an accelerator pedal equipped with the anti-vibration means.

Figure 4 is another side longitudinal cross-sectional view of another accelerator pedal equipped with the anti-vibration means.

Figure 5 is a top plan-view of Figure 4.

Figure 6 is another side cross-sectional view of the anti-vibration means.

Figure 7 is a schematical cross-sectional view of another aspect of the invention showing a multiple arrangement of the anti-vibration means.

Figure 8 is a cross-sectional view of another anti-vibration means.

Figures 9, 10, and 11 are cross-sectional views of a cushion provided with the anti-vibration means.

Figure 12 is a side cross-sectional view of the handle of a gear-shift equipped with the anti-vibration means.

Figure 13 is a schematical view in perspective of a steering wheel equipped with the anti-vibration means.

Figure 14 is a cross-sectional view of the anti-vibration means as used in Figure 15 in enlarged section.

Figure 15 is a cross-sectional view of another aspect of the anti-vibration means employed for covering floors or the like.

Figure 16 is a schematical view of a refrigerator, which is mounted on the anti-vibration means and the motor of which, in addition, is mounted on the said anti-vibration means.

Figure 17 is a schematical side-view of the leg of a piano resting on the anti-vibration means.

Figure 18 is a schematical cross-sectional view of a tube or pipe mounting provided with anti-vibration means.

Figure 19 is a schematical side-view of a motor unit mounted on the anti-vibration means.

Figure 20 is a schematical side-view of a vehicle equipped with anti-vibration means.

Figure 21 is a schematical side-view of a microphone standing on a support anti-vibration means.

Figure 22 is a schematical side-view of a wall of the chassis of an automobile or aeroplane equipped with anti-vibration means on which a radio set or the instruments, meters, clocks, etc., are attached.

Figure 23 is a schematical side-view of a typewriter resting on the anti-vibration means.

Figure 24 is a cross-sectional schematical view of a vibrating body resting on the anti-vibration means placed on the floor, which floor is the ceiling of the room below, in which ceiling another anti-vibration means is introduced to which a receiving body is attached (such as a lighter or some other object).

Figure 25 is a schematical side-view arrangement of a reciprocating engine, equipped with spring type anti-vibration means.

Figure 26 is a cross-sectional schematical side-view of a power cable.

Figure 27 is cross-sectional view of a standardized sheet-like anti-vibration means.

Figure 28 is a cross-sectional schematical side-view of another type of anti-vibration means to be adapted in sheet form.

Figure 29 is a cross-sectional schematical side-view of a membrane (pick-up) of a phonograph needle equipped with anti-vibration means.

Figures 30, 31 and 32 are cross-sectional views in perspective of anti-vibration washers for general use, partly broken out.

One of the aspects of this invention is shown in Figure 1 wherein V is the vibrating body and the anti-vibration means rests thereon or is attached by suitable means thereto. The anti-vibration means consists of a soft elastic layer $S_1$ the lower surface of which directly contacts the vibrating body. The upper surface of the soft elastic layer $S_1$ receives and directly contacts a rigid body W which should preferably be made of heavy material such as lead, bronze, iron and/or any other equivalent. The upper part of W contacts a soft elastic layer $S_2$. $S_1$ and $S_2$ may be adapted of rubber sponge, soft rubber, felt, a mixture of rubber and felt, or any other type of material capable of absorbing or diminishing vibrations.

The vibrations produced by the vibrating body are first received by $S_1$ which transmits them in reduced or altered form to the weight W, which weight W being preferably a rigid body, should be made of a material that will enable it to resist impacts. At the same time this weight, being freely suspended between two soft elastic layers $S_1$ and $S_2$, may itself freely move or slightly oscillate between the said layers due to the fact that the weight possesses its own center of gravity (or symmetry axis of gravity) around which it will oscillate if it is moved from its original position. The vibrations transmitted to W from V through layer $S_1$ will cause W to start to vibrate and oppose its inert weight to the said vibrations, i. e. the vibrations must meet the impact resistance of the weight W. The weight being relatively freely (i. e. very resiliently) suspended between layers $S_1$ and $S_2$ will automatically and continuously amortize the chief portion of the vibrations and will transmit to layer $S_2$ only a very small amount of vibration if at all, or, the interference between the vibrations of the weight W itself and the vibrations which the weight receives from layer $S_1$ may amortize in the main the transmission of vibration to the receiving body.

It is to be noted that for greater efficiency, it is preferable that weight W have great specific density, i. e., inert materials such as lead or mixtures of mercury with lead and other alloys, as well as mixtures of bronze and lead or copper and lead; ordinary gray cast iron, heavy stone, granite, marble, etc. etc., may be used with success. The use, however, of component layers, such as iron covered by lead, or lighter rigid layers such as wood, Bakelite, etc., if their weight is sufficient to produce the necessary effect for a particular purpose, is not excluded, or if layers $S_1$ and $S_2$ are so delicate and soft that a heavy weight would compress them causing them to lose the free elasticity necessary for anti-vibration reaction.

Throughout the drawings, the soft resilient layers are shown by a hatching as for rubber-sponge. However, any equivalent is indicated, as are likewise soft, semi-soft or flexible layers.

Owing to the fact that, generally speaking, the heavy weight W controls the efficiency of the device by its inertia, it is advisable to employ the heaviest materials possible under the circumstances. It is not absolutely essential that the heavy weight be a rigid body. It may be a sack, for instance, filled with metallic dust or buckshot. Very satisfactory results can be obtained by the employment of such a device.

Excellent results are also obtained by replacing the heavy rigid weight W by a cushion filled with mercury which cushion may be made of rubber or of any other suitable material. This feature represents another aspect of the invention.

It is preferable that soft elastic layers $S_1$ and $S_2$ are so made that their elasticity will be continually maintained during the period of vibration.

In certain cases, instead of employing soft elastic layers, soft layers or soft flexible layers, flexible layers or semi-flexible layers may be employed with advantage, as for instance, layers of felt or hair of sufficient thickness which renders them, as a rule, not entirely compressible, and which layers possess even under certain pressure, a degree of flexibility and elasticity which enables them to return from a compressed position to their normal position or less compressed state.

By way of example, instead of an elastic layer, a brush-like layer may be employed. A hard brush may be used instead of layers $S_1$ and $S_2$ in which case the brush $S_1$ in Figure 2 should be turned downwards, weight W will lie on the brush's back, and the brush $S_2$ will be turned upward. A suitable covering should be provided for the bristles of the brush. Brush-like layers combined with rubber sponge layers may also be employed to perform the functions of $S_1$ or $S_2$ or both.

If soft wood is used as a layer, this also may serve to produce certain anti-vibration effects if the weight of W is sufficient to oppose its inert weight to the vibrations transmitted through the wood. This may occur particularly in cases of very high frequency vibrations for which the compressibility of wood offers sufficient relative elasticity.

Figure 2 shows a device similar to that in Figure 1 with the difference that $S_2$ is provided with a protective covering C. This protective covering may be a plate of metal or the equivalent, or it may be a flexible covering of textile, leather, rubber, etc.

On Figure 1 and in several other figures, the components $S_1$, W and $S_2$ are illustrated in straight form and as plate surfaces. However, this invention also embraces any surfaces curved in more than one plane; for example, layers $S_1$ or $S_2$ may follow any contour desired, such as a parabola, or an ellipse; edges or parts may be constructed up or down, as desired. These variations are not shown in the drawings, being self-explanatory.

In some cases, it may be advisable to use an anti-vibration means composed of layer $S_1$, weight W, and layer $S_2$, with the surface of layer $S_2$ covered with an additional heavy rigid body $W_2$ instead of the covering C as shown on Figure 2.

Such a device—$S_1+W_1+S_2+W_2$—constitutes another embodiment of this invention.

An important feature of the invention herein disclosed is the choice of the character of the compressibility and elasticity of the soft elastic layers or the like, $S_1$, $S_2$, etc. If, for instance, weight W is comparatively heavy, layer $S_1$ on which the weight rests should be so chosen that it will not be too greatly compressed. If the receiving body is an object which is not heavy (such as a hand, a foot, a speedometer, etc.) then layer $S_2$ may be softer than $S_1$. All possible combinations of layers of varying elasticity may be used.

The soft resilient layers may also consist of metal shavings offering a spring-like effect, or compressible sawdust, especially wood dust or mixtures of sawdust and rubber shavings. Especially good results are produced by using cork in small pieces, or cork shavings, or cork mixed with small pieces of rubber sponge. If cork is too expensive or not available, bark may be employed, also wool or other fibrous materials in the raw state. Any of these materials or their equivalents may first be made in the form of a mattress or cushion to form a layer.

Figures 3, 4, 5 and 6 show the anti-vibration means applied on a throttle. It is important to note that one aspect of this anti-vibration means consists in a cup-form anti-vibration device, Figure 3, which can be affixed very quickly and without difficulty to the throttle pedal. The throttle T is, in this case, the vibrating body. In modern cars, the throttle is usually covered with hard rubber $Sh$. This will not change the efficiency of the invention.

The anti-vibration device, for an accelerator pedal, may have layer $S_1$ constructed in the form of a straight plate or it may follow the side contour of the throttle T. Weight W and layer $S_2$ if required, may also follow the contour of the adjacent surfaces of layer $S_1$. The flooring F may be provided with anti-vibration means in the form of a support-layer on which the heel of the foot may rest to simultaneously eliminate the vibrations transmitted through the floor of the car to the foot.

On Figure 6 there is illustrated another aspect of an anti-vibration means throttle for an accelerator pedal which, being intentionally extended longitudinally, rests on a special rubber cushion $S_3$. The shoe K may be placed either on the device or on the floor as shown in $K_1$, Figure 13. The effect of this device is obvious. If desired, the covering C and S may be eliminated and $S_1$ will then directly contact the pedal T and the floor F.

Another provision of this invention consists in employing the anti-vibration means in series, i. e. instead of a single anti-vibration unit, multiple units may be used. By way of example, triple anti-vibration means in a series may be employed, as shown in Figure 7, wherein V is the vibrating body, $S_1$ is the first elastic layer, $S_2$ the second, $S_3$ the third and $S_4$ the fourth: $W_1$ is the first weight, $W_2$ is the second, and $W_3$ the third; C is the protective covering. It is obvious that the number of weights is generally one less than the number of soft elastic layers. In a combination of double anti-vibration units, there will be $W_1$ and $W_2$ and $S_1$, $S_2$, and $S_3$. Such multiple anti-vibration units are very efficient in operation.

Various means may be employed to attach the elements of the anti-vibration means together for attachment to the vibrating body. For instance, $S_1$ may be attached by its lower surface to V by means of glue or other fixation means, such as wires, belts, cords or their equivalents. The upper surface of $S_1$ may be attached to $V_1$ etc. The fixation means are not shown in the drawings, being self-explanatory. Where difficulty is encountered in making such attachments, a duplicate anti-vibration means may be employed as shown on Figure 8 placed between two elements: for example, anti-vibration means composed of $S_4$, $W_4$, $S_5$, and anti-vibration means $S_6$, $W_5$, $S_7$, both of which units are rigidly attached to a chassis or a wall, or if that is not possible, rigidly attached to the said V.

Nearly all the various aspects or embodiments described in this specification are shown in horizontal position: i. e. the vibrating body is below the anti-vibration means and the receiving body is above it. Other variations are possible, as for instance, a vice-versa arrangement.

The anti-vibration means may also be placed on the vertical surface of a vibrating body held in position by suitable means, such as additional layers of soft rubber, sponge, etc.

Another feature of this invention consists in using metal springs instead of the soft elastic layer previously described.

In Figure 9, for purposes of example only, the anti-vibration means consists of a set of springs $Z_1$ and $Z_2$ instead of layers $S_1$ and $S_2$ as described in Figure 1. In this case, it is advisable that $Z_2$ be attached to a covering plate C preferably rigid or semi-flexible. The characteristics of $Z_1$ and $Z_2$ may be so chosen that their reaction and effect are equal: they may possess the same resonance and elasticity or they may be entirely different from each other so that they do not work in resonance and their own vibration harmonics interfere with each other. All these variations may be employed.

A further provision of this invention similar to that shown in Figure 9 may have springs $Z_1$ consisting of springs, the layer $Z_2$ being a rubber cushion, or vice versa.

Still another feature of this invention consists in providing a mixed layer, which, for example, may be rubber sponge or a very soft felt in which are mounted several springs, SZ, as shown in Figure 10. Such a layer will simultaneously possess the elastic characteristics of rubber and spring.

An additional aspect provides different types of cushions for seats of automobiles, cars, trains, etc. These cushions may be placed on the existing seats or built in the seats. For example, Figure 10 shows such a cushion wherein the lower part is provided with a rigid plate P. This plate, however, may be eliminated and an ordinary flexible cover used instead. SZ is a mixture of rubber, sponge and springs. $W_1$ is the weight, $S_2$ is the soft elastic layer on which the body or the hand will rest. C is a covering. $C_1$ is a filling provided to prevent the tightening of the covering. Such a cushion, compressed by weight, is illustrated in Figure 11.

An anti-vibration means may be used in a vehicle for the elbows; for the seat; for the calf of the foot; for the foot; for the floor; for the accelerator pedal and for the steering wheel.

A still further aspect consists in an anti-vibration means especially designed for use with the handle of a gear shift or any kind of tools which vibrate, as shown in Figure 12 and is self-explanatory.

In case of a street drill or other vibrating tool or instrument for mining, etc., which the operator's hand, foot or other parts of his body contacts, the respective operating part of such tools should be provided with a suitable type of anti-vibration means. Instead of mounting an anti-vibration device on an existing handle, the handle may be removed and replaced by a new handle consisting of the anti-vibration unit.

In Figure 13 is shown, by way of example, an anti-vibration means $AVM_8$ for use with a steering wheel. It may eventually be made as shown on Figure 14 in cross-section.

Still another aspect is shown in the form of a plate to cover the floor which may consist of different elements $W_a$, $W_b$, $W_c$, $W_d$, resting on corresponding elements, $S_{1a}$, $S_{1b}$, $S_{1c}$, $S_{1d}$, $S_{1e}$, and covered by corresponding elements, $S_{2a}$, $S_{2b}$, $S_{2c}$, $S_{2d}$, etc. Large plates cut to conform to requirements may be employed.

The elements $W_a$, $W_b$, etc. as shown in this arrangement are not of one piece. They may be separated between themselves by spaces (air-gaps) or by vertical, very soft rubber layers or the like. This means of separation may itself consist of small separate cushions of rubber as shown, $S_5$, $S_6$.

Another feature of this invention is shown on Figure 16 wherein anti-vibration means $AVM_1$ is employed for a refrigerator wherein the motor M rests on the anti-vibration means and the entire refrigerator itself rests on another anti-vibration unit $AVM_2$ placed on the floor F.

Another novel embodiment of the device consists in having a small layer of desired contour used as a support for the leg of a piano or of a tool table, as shown in Figure 17 wherein the leg L rests on the anti-vibration means AVM which rests on the floor F.

Still another aspect of this invention is an anti-vibration unit mounting for tubing as shown in Figure 18.

Another aspect consists in mounting a reciprocating engine (or any other engine) by means of one or more simple or multiple anti-vibration means. On Figure 19 a motor M is shown schematically resting on the floor F and a single anti-vibration means interposed between the floor and the motor.

Figure 20 shows another aspect wherein the motor M of a vehicle is separated from the chassis by 6 individual anti-vibration means, i. e. instead of having the motor resting directly on the chassis, it rests on six (6) anti-vibration units, three of which are seen from the front view: $AVM_1$, $AVM_2$, $AVM_3$. The body of the vehicle itself is also separated from the chassis by means of 2 or 4 anti-vibration units, for instance, $AVM_7$, and $AVM_8$. Such a vehicle will provide a reduction in vibrations as yet unexperienced. It is advantageous to have the spring arrangement mounted with very heavy plates for damping motor vibrations. Since motors are sometimes very heavy, several springs for each spring layer and very heavy plates will be required, but a great part of the vibrations will be eliminated thereby.

Another aspect is shown in Figure 21 which consists in mounting a microphone $M_{23}$ on the anti-vibration support.

This invention may also be applied for the mounting of radios, various kinds of instruments and speedometers on the instrument board of a vehicle, aeroplane, ship and the like. $F_1$ is the wall of the board of such a vehicle, the anti-vibration unit being interposed between the wall and the radio or instrument $R_1$.

On Figure 23 the anti-vibration means is used as a support for a typewriter R. This arrangement will also eliminate the vibration of the table. In addition to this, if desired, some elements of the typewriter may also be so mounted that the anti-vibration means may be introduced between the typewriter chassis and the said parts. Also, each key can be provided with a cap having an anti-vibration unit.

Figure 24 shows the employment of the anti-vibration unit $AVM_1$ placed on a floor F of a room for mounting a machine, without which unit, vibrations would be transmitted to the floor. In addition, below the floor F, in the ceiling X, beneath, is mounted anti-vibration means, $AVM_2$ on which may be mounted any object $R_3$.

It is noteworthy that the anti-vibration mountings can be generally employed to operate on the principle of compression as described in this specification in all figures except Figures 22 and 24. In Figure 22 the mounting of anti-vibration unit $AVM_1$ works partly by a shearing action due to its being at an angle or in a more or less vertical position, and partly by compression.

In Figure 24 the mounting of the anti-vibration unit $AVM_2$ operates on decompression. Such type of mounting is extremely important for several applications. For such mountings, it will be advisable to employ special soft elastic layers which will permit the article to hang safely from it. This may also be easily accomplished by spring means instead of soft elastic layers. The devices using a shearing or decompression action of soft resilient layers, constitute a further aspect of this invention.

Figure 28 shows an arrangement of a weight $W_3$ combined through elastic or spring means $Z_1$, $Z_2$, $S_3$, and $Z_4$ to a cable, the weights $W_1$ and $W_2$ being interposed as shown on the figures. Such arrangements will permit the elimination of nearly all vibrations. A heavy weight $W_3$ attached to the described system will act as a damping mass. This system may be used for telephone cables, wires, power lines, aeroplane trusses, bridge cables, etc. It is important that the weights $W_1$, $W_2$ and $W_3$ be sufficiently heavy. It is also important that the system, in particular the weight $W_3$ in combination with the anti-vibration units, be so chosen that the point of gravity of the whole device $v'$ d make it possible for the device to oscillate parallel to the longitudinal axis of the cable so that the longitudinal gravity axis of the device will remain substantially parallel to the longitudinal axis of the cable. In addition, the vertical gravity axis should be preferably symmetrical and perpendicular to the longitudinal axis. If this is not possible, then the center of gravity should lie somewhere on the vertical symmetry axis of the entire device, if the cable hangs substantially horizontal. $Z_1$, $Z_2$, and $W_1$ form a separate unit resting by its own gravity on the cable. In this case, $Z_3$, $W_2$ and $Z_4$ will also be a separate unit. However, it is possible that $W_1$ and $W_2$ will also be one tube-like body or may be separated, which is more advantageous. The same holds true for $Z_1$ and $Z_4$.

Still another aspect of this invention is shown on Figures 27 and 28, which represent a standard type of anti-vibration plates or sheets of large dimensions, which may be cut to size to suit a desired purpose. The two coverings $C_1$ and $C_2$ may be flexible or of wood or metal, according to requirements.

The weight interposed between $S_1$ and $S_2$ may be not of one piece, but consist of small elements J, or it may be in the form of lead balls or metal balls J as shown on Figure 28.

The layers $S_1$ and $S_2$ may be continuous as shown in Figure 27 or divided into small units J between which units there may be a free space or a very soft sponge-like material. One covering may be of the one piece, and the other may be divided into parts.

Figure 29 shows how the anti-vibration mounting may be applied for a pickup of a gramophone on which pickup a needle is mounted, the said pickup being enclosed in a frame and maintained in its operating position through the intermediary of several anti-vibration devices such as herein described, $AVM_7$ and $AVM_8$, placed in suitable positions.

Such a mounting has many advantages, and owing to the fact that the weight involved in this case is small, the soft layers of the said anti-vibration units, $AVM_7$ and $AVM_8$ will or may be extremely sensitive.

Figure 30 shows a standard washer with a hole which may be used with any screw or bolt. W is the weight; $S_1$ and $S_2$ the soft elastic layers; $C_1$ and $C_2$ the covering; the inner-cut-out has an additional soft layer $S_3$.

Instead of this soft layer $S_3$, another anti-vibration unit may be mounted thereon so that instead of $S_3$ there will be $S_4$, $W_4$ and $S_5$ as shown in the said figure.

If necessary, a washer may, in addition, also be surrounded by a special soft layer $S_6$ and $S_7$ as shown on Figure 32, which may prove very efficient.

Still another feature of this invention consists in using a cushion filled with air or gas instead of a soft resilient layer, the air-pressure to be determined upon. The cushion may be made of textile, rubber or of any resilient or semi-resilient material. In certain cases, fluid, such as water, may be used instead of gas or air, or mixed air and fluid.

Having now particularly described and ascertained the nature of my said invention and in what manner the same is to be performed, I declare that what I claim is:

1. A resilient supporting member to be interposed between a support and supported object for dampening the transmission of vibration originating in the said support or in the said supported object, said supporting member comprising two resilient spacing means and a free floating member interposed between the said resilient spacing means, said interposed free floating member having sufficient weight to provide a substantial amount of inertia for dampening the said vibrations.

2. A resilient supporting member to be interposed between a support and supported object for dampening the transmission of vibration originating in the said support or in the said supported object, said supporting member comprising two resilient spacing means and a free floating member interposed between the said resilient spacing means, said interposed free floating member having sufficient weight to provide a substantial amount of inertia for dampening the said vibrations, said two resilient spacing means covered by a protective layer on at least one of their sides.

3. A resilient supporting member to be interposed between a support and supported object for dampening the transmission of vibration originating in the said support or in the said supported object, said supporting member comprising two resilient spacing means and a free floating member interposed between the said resilient spacing means, said interposed free floating member having sufficient weight to provide a substantial amount of inertia for dampening the said vibrations, said two resilient spacing means consisting of rubber covered by protective layers on their surfaces opposite to the said free floating member.

4. A resilient supporting member to be interposed between a support and a supported object for dampening the transmission of vibration originating in the said support or in the said supported object, said supporting member comprising two resilient spacing means and a free floating member interposed between the said resilient spacing means, said interposed free floating member having sufficient weight to provide a substantial amount of inertia for dampening the said vibrations, one of the said two resilient spacing means consisting of rubber covered by a protective layer, and the other of the said two resilient spacing means consisting of springs.

5. A resilient supporting member to be interposed between a support and supported object for dampening the transmission of vibration originating in the said support or in the said supported object, said supporting member comprising two resilient spacing means and a free floating member interposed between the said resilient spacing means, said interposed free floating member having sufficient weight to provide a substantial amount of inertia for dampening the said vibrations, said two resilient spacing means consisting of springs.

6. A resilient supporting member to be interposed between a support and supported object for dampening the transmission of vibration originating in the said support or in the said supported object, said supporting member comprising two resilient spacing means and a free floating member interposed between the said resilient spacing means, said interposed free floating member having sufficient weight to provide a substantial amount of inertia for dampening the said vibrations, each of said two resilient spacing means being composed of rubber and springs and preferably covered on their sides with protective layers.

GEORGE A. RUBISSOW.